United States Patent [19]

Kitazawa et al.

[11] Patent Number: 5,309,184
[45] Date of Patent: May 3, 1994

[54] MECHANICAL CONTROL APPARATUS OF A SINGLE LENS REFLEX CAMERA

[75] Inventors: Toshiyuki Kitazawa; Tomoaki Itabashi, both of Tokyo, Japan

[73] Assignee: Asahi Kogaku Kogyo Kabushiki Kaisha, Tokyo, Japan

[21] Appl. No.: 944,277

[22] Filed: Sep. 14, 1992

[30] Foreign Application Priority Data

Sep. 12, 1992 [JP] Japan ................... 3-96363

[51] Int. Cl.⁵ .................. G03B 9/00; G03B 19/12
[52] U.S. Cl. .................... 354/231; 354/152
[58] Field of Search ........... 354/152, 231, 251, 439

[56] References Cited

U.S. PATENT DOCUMENTS

| | | | |
|---|---|---|---|
| 3,893,141 | 7/1975 | Uno et al. | 354/156 |
| 4,179,206 | 12/1979 | Tezuka et al. | 354/152 |
| 4,195,925 | 4/1980 | Ishii et al. | 354/270 |
| 4,441,800 | 4/1984 | Nakano | 354/152 |
| 4,538,893 | 9/1985 | Nakano et al. | 354/412 |
| 4,914,465 | 4/1990 | Saegusa et al. | 354/412 |
| 4,958,175 | 9/1990 | Asakura et al. | 354/152 |
| 5,070,349 | 12/1991 | Haraguchi et al. | 354/152 |
| 5,150,141 | 9/1992 | Uematsu | 354/152 |

FOREIGN PATENT DOCUMENTS 4023957  1/1991  Fed. Rep. of Germany .

OTHER PUBLICATIONS

French Search Report and Annex.

Primary Examiner—Michael L. Gellner
Assistant Examiner—Nicholas J. Tuccillo
Attorney, Agent, or Firm—Sandler, Greenblum & Bernstein

[57] ABSTRACT

A mechanical control apparatus of a single lens reflex (SLR) camera is provided that includes a rotatable cam having a shutter cam for charging a shutter and a mirror cam, integral and coaxial with the shutter cam, for charging a mirror. The mechanical control apparatus further includes a diaphragm resetting lever, coaxial to the rotatable cam, for resetting a diaphragm of the camera in association with the rotation of the cam.

21 Claims, 10 Drawing Sheets

MECHANICAL CONTROL APPARATUS OF A SINGLE LENS REFLEX CAMERA

BACKGROUND OF THE INVENTION

1. Field of the Invention

The present invention relates to a control apparatus of a single lens reflex (SLR) camera which mechanically controls the charging time of a shutter and resetting time of a diaphragm.

2. Description of Related Art

In a SLR camera, it is preferable that a diaphragm driving mechanism resets the diaphragm to an open position while a mirror is being moved from an upper position to a lower position (i.e., viewing position) after the exposure is completed. If diaphragm resetting is not effected at this time, the opening movement of the diaphragm may be undesirably visible within a view finder.

To reset the diaphragm, at the time mentioned above, it is known to provide a cam gear, with a special cam, in the diaphragm driving mechanism, and a special operation lever which is associated with the cam gear. The resetting operation of the diaphragm is effected in association with the downward movement of the mirror through the association of the cam gear and the operation lever. Consequently, it is very difficult to match the timings of the associated operations.

Furthermore, the special cam requires additional space and includes a shutter cam to charge the shutter and a mirror cam, separate from the shutter cam, to move the mirror into the viewing position. Such space requirements prevent the realization of a compact camera.

SUMMARY OF THE INVENTION

The primary object of the present invention is to provide a mechanical control apparatus of an SLR camera in which the resetting operation of the diaphragm is effected in association with the charging or cocking movement of the mirror by a simple and small mechanism to realize a compact camera.

To achieve the object mentioned above, according to the present invention, there is provided a mechanical control apparatus of a camera comprising a rotatable cam mechanism having a shutter cam for charging a shutter and a mirror cam, integral and coaxial with to the shutter cam, for charging a mirror, and a diaphragm resetting mechanism coaxial with the rotatable cam mechanism, for resetting a diaphragm of the camera in association with the rotation of the cam mechanism.

With this arrangement, the construction can be simplified in comparison with that of prior art, in which a shutter cam, a mirror cam, a diaphragm resetting cam gear of a diaphragm driving mechanism and a special operation lever associated with the cam gear, etc., are separately provided. This arrangement also makes it possible to realize a small and compact camera.

Preferably, a control apparatus of the present invention further comprises a mirror charge lever adjacent to the rotatable cam mechanism for transmitting rotation of the mirror cam to the mirror. The mirror charge lever can be provided with a roller pin through which the mirror cam rotates the mirror charge lever.

Preferably, the mirror charge lever has an association pin which rotates the diaphragm reset lever together with the mirror charge lever when the latter rotates.

With this structure, the reset lever is actuated by the mirror charge lever associated with the mirror cam to easily and precisely synchronize the reset time of the diaphragm with the downward movement of the mirror.

Preferably, the main diaphragm latching lever, the shutter charge lever, and the mirror charge lever are partly or entirely located in a limited small space including the rotatable cam means.

The present disclosure relates to subject matter contained in Japanese Utility Model Application No. 3-96363 (filed on Sep. 12, 1991) which is expressly incorporated herein by reference in its entirety.

BRIEF DESCRIPTION OF THE DRAWINGS

The present invention will be described below in detail with reference to the accompanying drawings, in which.

DESCRIPTION OF THE PREFERRED EMBODIMENT

The illustrated embodiment of the present invention is applied to a single lens reflex camera having a strobe incorporated therein, in which the photometering operation is started when a shutter button is depressed by a half step and the shutter is released when the shutter button is depressed by a full step.

Figure 10:
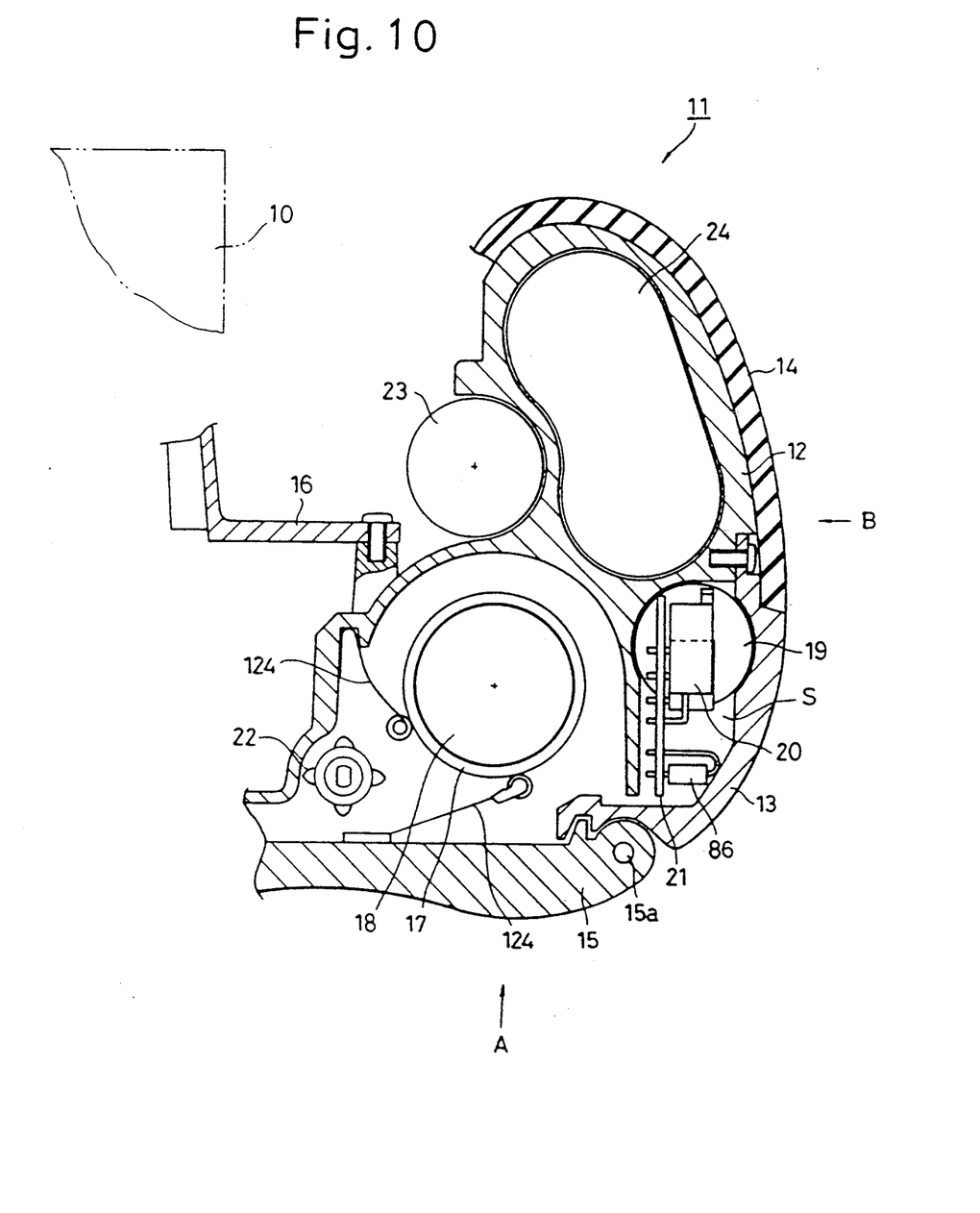
FIG. 10 is a sectional plane view of elements provided within a camera grip portion; and, FIG. 11 is a side elevational view of a film motor and a strobe circuit board in assembly.

As can be seen in FIG. 10, a grip portion 11 provided in a camera body 12 is provided with a grip rubber 14 on the front end thereof and a side cover 13 on the rear side thereof. A back cover 15 is pivoted with respect to the camera body through a pivot shaft 15a behind the grip portion 11. A spool 17, in which a charging motor 18 is housed, is rotatably mounted in the camera grip portion 11. A film motor 19, a strobe circuit 20, a strobe circuit board 21, a sprocket 22, a strobe main condenser 23, and a battery 24 are provided around the spool 17. The strobe main condenser 23 and the film motor 19 are located side by side and each have lengthwise directions thereof that are parallel to one another. Numeral 16 designates a front plate secured to the camera body 12 by set screws.

The spool 17 and its surroundings are discussed below, with reference to FIG. 1.

The charging motor 18 has an output shaft 18a which has a pinion 25 secured thereto. The pinion 25 is in mesh with a gear 26, which constitutes a reduction gear train 29 together with gears 27 and 28. Gear 28 is in mesh with a cam gear 32 that is rotatably supported on one end of a rotational shaft 61.

The cam gear 32 is integrally provided with a shutter cam 30 and a mirror cam 31 coaxial to the shutter cam 30, and is rotatably supported by the camera body 12 through the rotational shaft 61. Cam gear 32 is located substantially at a center of a mirror driving (charging) lever 33.

Figure 5:
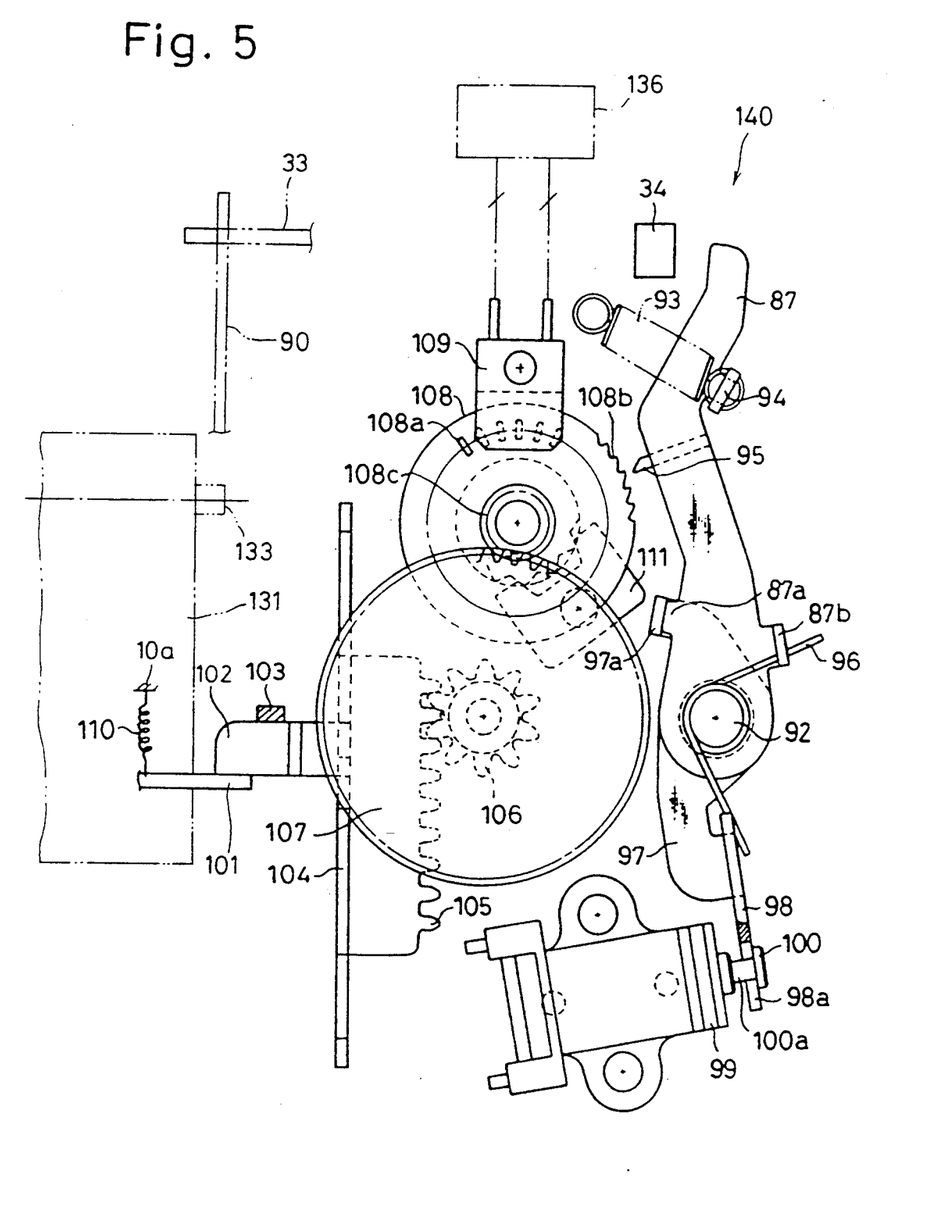
FIG. 5 is a side elevational view of a diaphragm driving mechanism, shown in an open position prior to the releasing operation.

A diaphragm resetting lever 34 is rotatably mounted to the lower end of the rotational shaft 61 to reset a diaphragm driving mechanism 140 (see FIG. 5). Consequently, the shutter cam 30, the mirror cam 31, and the diaphragm resetting lever 34 are coaxial to each other. This simplifies the structure and reduces the space necessary therefor, in comparison with the prior art in which the shutter cam, the mirror cam, and the diaphragm resetting cam gear of the diaphragm driving mechanism, etc., are separately and independently provided The reduction in space allows for the realization of a compact camera.

Figure 2:
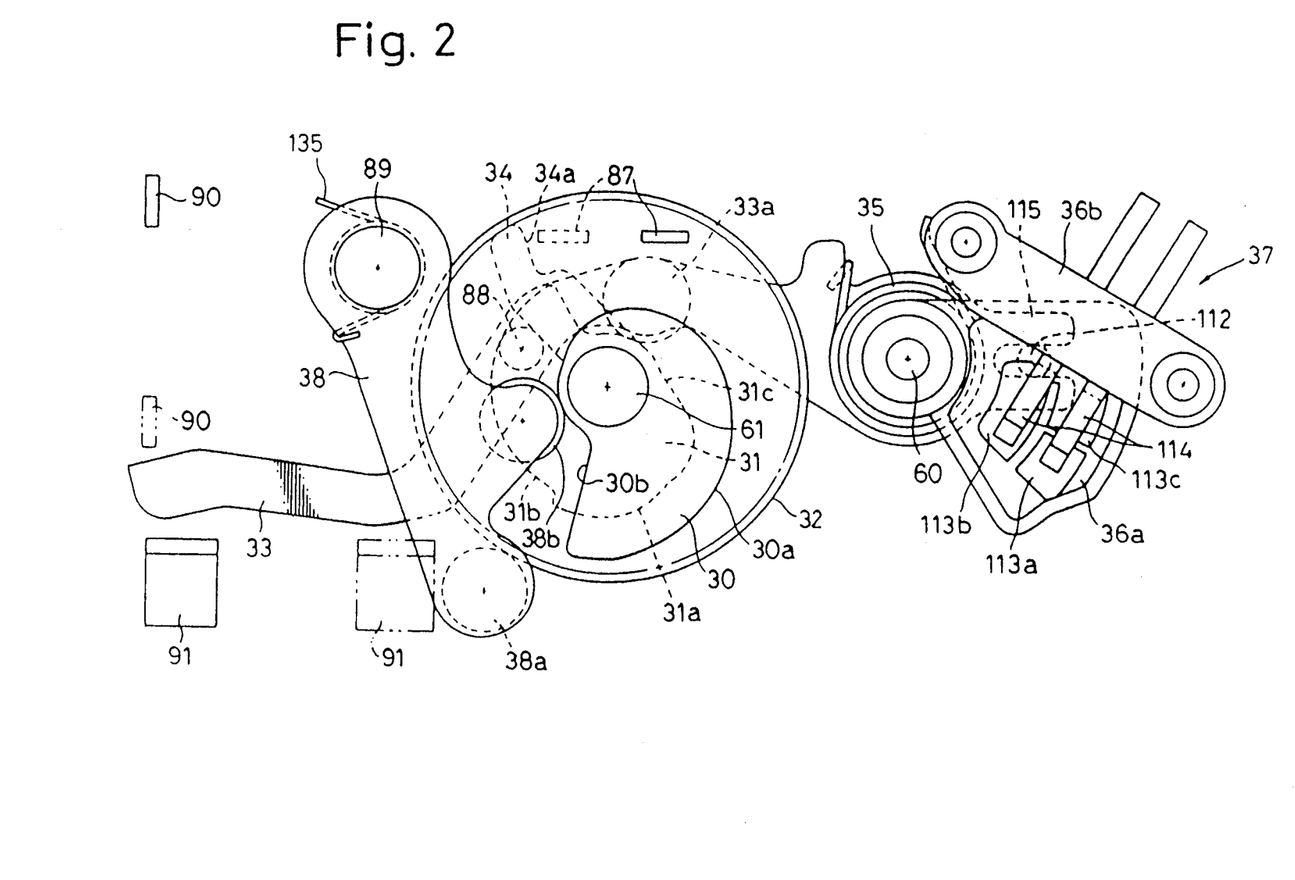
FIG. 2 is a plane view of a shutter charging mechanism and a mirror driving (charging) mechanism of a single lens reflex camera, shown in a position prior to shutter release.

The shutter cam 30, which constitutes a shutter charging mechanism for charging the shutter, has an involute cam surface 30a which gradually increases in diameter as it rotates, and a rear surface 30b, as shown in FIG. 2.

The mirror cam 31 which constitutes a mirror driving (charging) mechanism for driving a mirror 131 (FIG. 5) consists of a first cam surface 31a having the largest diameter, a second cam surface 31b having a diameter smaller than the diameter of the first cam surface 31a, and a rear surface 31c. The mirror driving lever 33 (referred to as a mirror charge lever), which constitutes the mirror driving (charging) mechanism together with the mirror cam 31, is rotatably supported on the camera body 12 through a rotational shaft 60 and is continuously biased by a coil Spring 35 in the counterclockwise direction. The mirror charge lever 33 is provided on the lower intermediate portion thereof with a roller pin 33a and an association pin 88 spaced from the roller pin 33a. The mirror charge lever 33 rotates about the axis of the rotational shaft 60 when the roller pin 33a is depressed by the mirror cam 31, which rotates in the counterclockwise direction, as shown in FIG. 2.

The diaphragm resetting lever 34 (referred to as a reset lever) is biased by a coil spring 134 in the counterclockwise direction to bear against the association pin 88. The reset lever 34 is rotated in the clockwise direction about the axis of the shaft 61 when it is depressed by the association pin 88, which is moved in accordance with the rotation of the mirror charge lever 33 in the same direction. A diaphragm latching lever 87 (see FIGS. 2 and 5) is depressed by the diaphragm resetting lever 34 to reset (i.e., open) the diaphragm of a taking lens 10 (see FIG. 10). Consequently, the reset lever 34 is directly rotated by the mirror charge lever 33, which is associated with the mirror cam 31. Accordingly, the reset timing of the diaphragm driving mechanism (i.e., the time at which the diaphragm is reset) can be associated with the downward movement of the mirror.

Note that positions of the diaphragm latching lever 87, shown by a two-dotted and a dashed line and solid line in FIG. 2, correspond to a stop-down position, after the release operation is completed, and a reset position of the diaphragm (i.e. stop), respectively.

The mirror charge lever 33 depresses a mirror association lever 90 at the front end (the left end in FIG. 2) thereof. Positions of the mirror association lever 90, shown by a solid line and a two-dotted and dashed line in FIG. 2, correspond to a lower extremity position of the mirror and an upper extremity position of the mirror after releasing, respectively.

A switch substrate 36a is mounted to the rotational shaft 60. The switch substrate 36a includes a pair of contacts 113b and 113c, which are not insulated from one another, and a contact 113a, which is insulated from the contacts 113b and 113c. The switch substrate 36a also has an association projection 112 projecting downwardly therefrom. The mirror charge lever 33 is provided, on an end thereof adjacent to the rotational shaft 60, with a bifurcated arm 115 which holds therein the association projection 112 to actuate the same. A switch lever 36b is secured to the camera body 12 having a bifurcated brush 114, which comes into sliding contact with the contacts 113a, 113b, and 113c of the switch substrate 36a. The switch substrate 36a and the switch lever 36b constitute a one-rotation switch 37 which detects one-rotation (i.e., one turn) of the cam gear 32.

The shutter charge lever 38, which forms a shutter charging mechanism together with the shutter cam 30, is rotatably supported by a rotational shaft 89 and is continuously biased by a coil spring 135 in the counterclockwise direction in FIG. 2. The shutter charge lever 38 has a charge pin 38a on the front end thereof and a roller pin 38b on the intermediate portion thereof, respectively. The roller pin 38b bears against the shutter cam 30 of the cam gear 32, so that when the roller pin 38b is pressed by the shutter cam 30, which is rotated in the counterclockwise direction in FIG. 2, the shutter charge lever 38 is rotated about the axis of the rotational shaft 89 in the clockwise direction. Numeral 91 designates an association lever which is pressed by the charge pin 38a which is moved in accordance with the rotation of the shutter charge lever 38 in the clockwise direction to charge the shutter.

Figure 1:
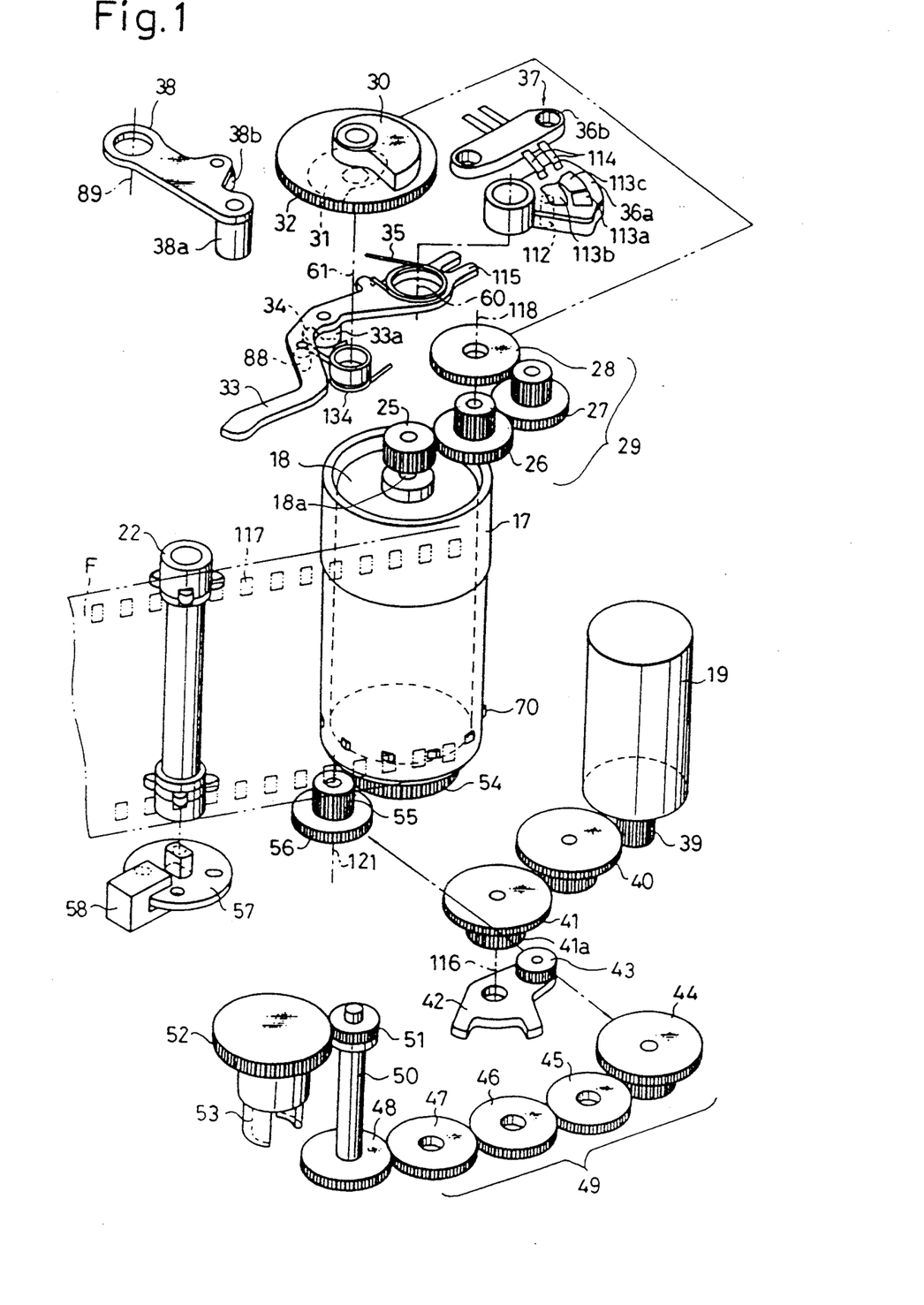
FIG. 1 is an exploded perspective view of a shutter charging mechanism and a mirror driving (charging) mechanism of a single lens reflex camera to which the present invention is applied.

As shown in FIG. 1, a sun gear 41 and a planet lever 42 are provided on the camera body 12 in the vicinity of the film motor 19. The sun gear 41 and the planet lever 42 are coaxially mounted to the same rotational shaft 116 so as to rotate relative to each other. The planet lever 42 has a planet gear 43 which is in mesh with a small gear 41a of the sun gear 41. The sun gear 41 is engaged by a gear 40 meshing with the pinion 39 secured to the rotational shaft of the film motor 19, so that rotation of the film motor 19 can be transmitted through the gear 40.

There is a rewinding reduction gear train 49 having gears 44, 45, 46, 47, and 48 adjacent to the planet gear 43. When the planet gear 43 is moved angularly in the clockwise direction together with the planet lever 42 by the rotation of the film motor 19, the planet gear 43 is engaged by the gear 44, adjacent thereto, to transmit the rotation thereof to a through shaft 50, a through shaft gear 51, and a rewinding gear 52, all of which elements are included in rewinding reduction gear train 49, to thereby rotate the rewinding fork 53 in the rewinding direction of the film.

A large diameter gear 56 and a small diameter gear 55, coaxial thereto and integral therewith, are rotatably supported on a rotational shaft 121 in the vicinity of the planet gear 43. The small diameter gear 55 is in mesh with a winding gear 54 provided on the peripheral end surface of the spool 17. When the planet gear 43 is rotated in the counterclockwise direction together with the planet lever 42 by the rotation of the film motor 19, the planet gear 43 is engaged by the large diameter gear 56 to transmit the rotation thereof to the rewinding gear 54 through the small diameter gear 55. As a result, the spool 17 thereby is rotated in the film winding direction.

A sprocket 22 is provided adjacent to the spool 17. The sprocket 22 is engaged by perforations 117 of the film F, so that the sprocket 22 can be rotated by the winding operation of the film F. The sprocket 22 is provided on the lower end thereof with a rotating plate 57 attached thereto, so that the number of revolutions of the rotating plate 57 is detected by a photo interrupter 58 to detect the amount of winding of the film F.

Figure 8:
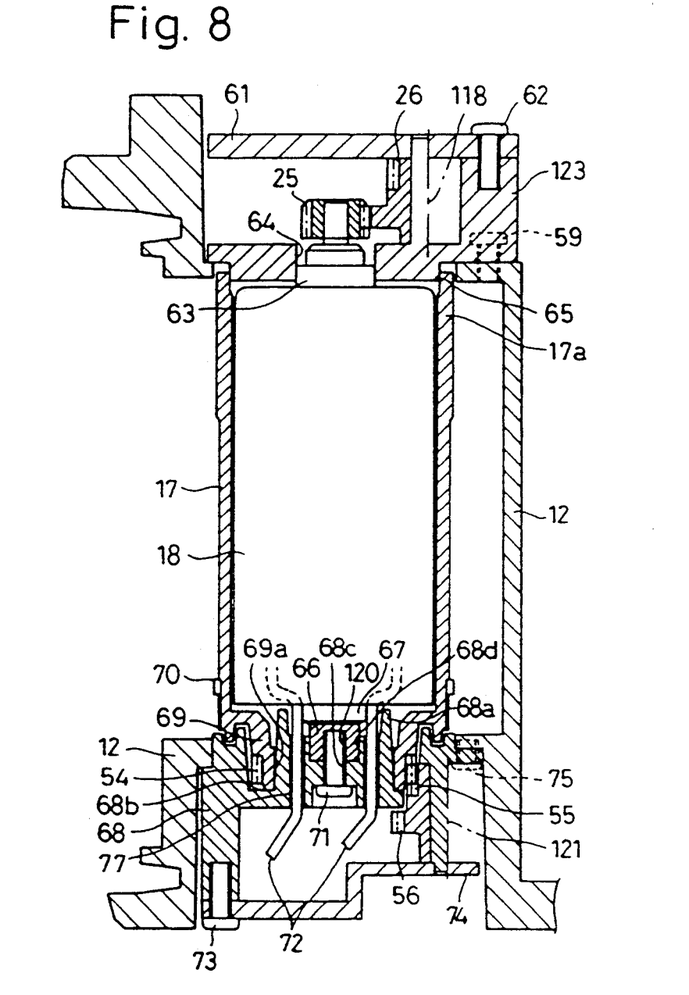
FIG. 8 is a sectional front elevation view of a motor supporting mechanism within a spool.

FIG. 8 is a sectional view in the direction of an arrow A in FIG. 10. An upper mother plate 123 is secured to the upper portion of the camera body 12 by set screws 59. The mother plate 123 has a rotational shaft 118 on which the gear 26 is rotatably supported. An upper keep plate 61 is secured to the upper portion of the mother plate 123 by set screws 62. The upper mother plate 123 has a positioning hole 64 in which a positioning projection 63 of the charging motor 18 is fitted, and a rotational supporting stepped portion 65 which rotatably supports one end of the spool 17 in which the charging motor 18 is coaxially provided.

Figure 9:
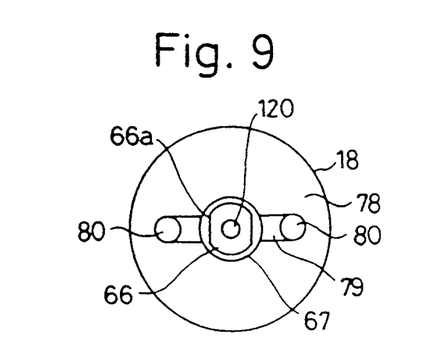
FIG. 9 is a bottom view of a charging motor within a spool.

The spool 17 is provided, on the other end thereof, with a rotational supporting projection 69 having the winding gear 54 formed on the outer peripheral surface thereof. The supporting projection 69 has an opening 69a through which lead wires 72, provided on the other end of the charging motor 18, extend outwardly. The other end of the charging motor 18 (away from the pinion 25) is provided with a motor bracket 78 (see FIG. 9), which has a wire guide portion 67 projecting outward therefrom and a generally oval-shaped positioning projection 66 projecting from the wire guide portion 67. A pair of lead wire holes 80, through which the lead wires 72 of the charging motor 18 extend outwardly, are formed in the bracket 78 on the right and left sides of the wire guide portion 67 and the positioning projection 66. The motor bracket 78 also has lead wire guide grooves 79 extending between the associated lead wire holes 80 and the wire guide portion 67.

A lower mother plate 68 is secured to the lower end of the camera body 12 by set screws 75. A lower keep plate 74 is secured to the lower side of the lower mother plate 68 by set screws 73. The lower mother plate 68 has an insertion recess 68b in which the supporting projection 69 of the spool 17 is rotatably inserted, a supporting projection 68a which is inserted in the opening 69a of the supporting projection 69 to slidably support the inner surface thereof, and a rotational shaft 121 on which the small diameter gear 55 engaging with the winding gear 54 is rotatably supported.

The supporting projection 68a is provided on the inner peripheral surface with a positioning hole 68d, in which the corresponding positioning projection 66 is fitted, and a center insertion hole 68c, in which a set screw 71 is inserted into a threaded hole 120 of the positioning projection 66. The supporting projection 68a is also provided with lead wire guide holes 77 adjacent to the positioning hole 68d. The lead wires 72 extend through the lead wire holes 80 along the guide groove 79, the guide portion 67 and the positioning projection 66. Consequently, the lead wires 72 inserted in the guide holes 77 are firmly held between the guide holes 77 and the guide portion 67. The lead wires 72 can thus be secured to the lower mother plate 68 without accidentally coming out of the guide holes 77.

Figure 11:
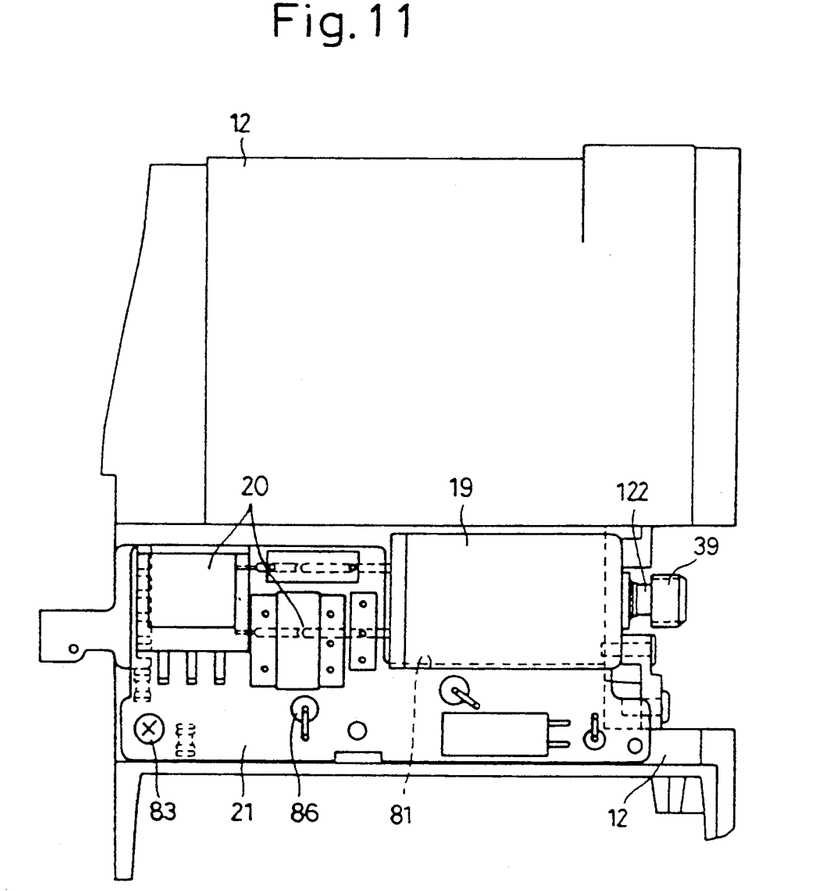

As can be seen in FIG. 10, the strobe circuit board 21 and the film motor 19 are arranged within a small space S defined by the side cover 13 of the camera grip portion 11, the battery 24 and the spool 17, etc. The strobe circuit board 21 has a generally L (i.e., hook) shape with a cut-away portion 81 having a length substantially identical to the length of the body of the film motor 19, as shown in FIG. 11. Consequently, when the film motor 19 is fitted in the cut-away portion 81 with the rotational shaft 122 extending along the length of the circuit board 21, the film motor 19 and the circuit board 21, together, form a generally rectangular shape. Accordingly, the small space S, shown in FIG. 10, extending in the vertical direction of the camera can be effectively utilized.

As shown in FIG. 10, the strobe circuit 20 is provided on the strobe circuit board 21. The strobe circuit 20 lies in a plane perpendicular to the axis of the rotational shaft 122 of the film motor 19 and within the space defined by a plan view of the motor 19. Accordingly, the film motor 19 and the circuit board 21 are effectively combined within a narrow circular space, within space S.

With this arrangement, the film motor 19 and the strobe circuit board 21, provided thereon with the strobe circuit 20 and a circuit element 86, can be effectively accommodated within the extremely narrow space S defined by the battery 24 and the spool 17, etc.

Note that numerals 124 and 83 in FIGS. 10 and 11 designate the spring which holds the film F wound by the charging motor 18 and the set screw which secures the strobe circuit board 21 to the camera body 12, respectively.

The diaphragm driving mechanism 140 which controls the diaphragm (stop) to be adjusted to a set value will be discussed below with reference to FIG. 5.

The diaphragm driving mechanism 140 is located adjacent to the spool 17 (see FIG. 1) and has a main diaphragm latching lever 87 which is engaged at one end thereof by a diaphragm reset lever 34. The main diaphragm latching lever 87 is rotatably supported by a supporting shaft 92 on the camera body 12 and has a latch pawl 95 which can be engaged by latch teeth 108b of a pulse plate 108. The main diaphragm latching lever 87 is provided with a spring mounting portion 94 to which one end of a return spring 93 is connected. The other end of the return spring 93 is connected to the camera body 12. Accordingly, the main diaphragm latching lever 87 is biased in the counterclockwise direction, as viewed in FIG. 5.

An auxiliary diaphragm latching lever 97 is rotatably supported on the rotational shaft 92, coaxial with the main diaphragm latching lever 87. The auxiliary diaphragm latching lever 97 has a receiving projection 97a at one end thereof and an association lever 98 at the other end. A connecting coil spring 96, which is wound about the rotational shaft 92, is connected to a spring engaging portion 87b formed on the rear side of the main diaphragm latching lever 87 at one end thereof and connected to the association lever 98 at the other end. Consequently, the main diaphragm latching lever 87 is biased in the counterclockwise direction in FIG. 5. The main diaphragm latching lever 87 has an engaging projection 87a which can be engaged by the receiving projection 97a during rotation in the counterclockwise direction. This allows for the main diaphragm latching lever 87 and the auxiliary diaphragm latching lever 97 to be rotated together in the counterclockwise direction, as viewed in FIG. 5.

Below the auxiliary diaphragm latching lever 97 is provided a diaphragm solenoid 99 which has a plunger 100 with a shaft portion 100a. Shaft portion 100a is engaged in an association cut-away groove 98a of the association lever 98. Consequently, the auxiliary diaphragm latching lever 97 is rotated and held in the counterclockwise direction or in the clockwise direction by the plunger 100 of the solenoid 99, projected and retracted when the solenoid 99 is activated or deactivated, respectively. As a result, the pulse plate 108 is latched or unlatched.

A rack supporting plate 104 is supported by a slide supporting mechanism (not shown) so as to be slid up and down. Rack supporting plate 104 has a rack 105 which is in mesh with a small diameter gear 106 coaxial to a large diameter gear 107 provided adjacent the main diaphragm latching lever 87. The taking lens 10 has a diaphragm adjusting lever 101 (on the lens side) which is movable up and down in association with the diaphragm and which is biased upwardly by a return spring 110 connected at one end thereof to the lens barrel 10a of the taking lens 10, as viewed in FIG. 5. The rack supporting plate 104 is provided, on the side thereof opposite rack 105, with a slide plate 102 which engages with the diaphragm adjusting lever 101 when the taking lens 10 is mounted to the camera body 12. This allows for the rack supporting plate 104 to be biased by the return spring 110 through the adjusting lever 101 to bias the rack supporting plate 104 upwardly. A (mirror side) swing lever 103 is provided so as to come into contact with the slide plate 102.

Rotatable pulse plate 108, adjacent to the large diameter gear 107, has a large number of pulse holes 108a along a circle concentric to the pulse plate 108, a large member of latch teeth 108b provided on the outer peripheral surface of the pulse plate 108, and a small diameter gear 108c coaxial to and integral with the pulse, plate 108.

A diaphragm photo interrupter 109 is provided adjacent to the pulse plate 108 to detect displacement of the rotating pulse holes 108a, by determining the number of the pulses corresponding to the variation of the diaphragm. The data is sent to the controller 136 (see FIG. 5).

An escapement mechanism 111 is provided for engaging with circumferentially provided notches or teeth in a plate mounted coaxially with pulse plate 108 to render the motion of plate 108 intermittent. The mechanism 111 includes a pivotedly mounted double armed lever, individual arms of which are alternately and intermittently engaged with spaced notches provided on the plate.

In a single lens reflex camera as constructed above, when the film F is wound by one frame, and when the shutter charge and mirror charge are completed (before releasing), the shutter charge mechanism and the mirror charge mechanism are in a position shown in FIG. 2. In this state, the shutter charge lever 38 is in an initial position in which the roller pin 38b bears against the rear portion 30b of the shutter cam 30, and the mirror charge lever 33 is in an initial position in which the roller pin 33a bears against the rear portion 31c of the mirror cam 31, respectively.

Shutter association lever 91 and the mirror association lever 90 are in a shutter charge completion position and a mirror charge position shown by solid lines in FIG. 2, respectively. Since the mirror charge lever 33 is in the angular end position in the counterclockwise direction, the association arm 115 moves the switch board 36a to a position shown in FIG. 2, relative to the switch lever 36b, through the association projection 112. Consequently, the two brushes 114 contact with the contacts 113a and 113b.

In the diaphragm driving mechanism 140, the swing lever 103 on the mirror side holds the slide plate 102 in a position shown in FIG. 5. The diaphragm adjusting lever 101 on the lens side is held, in a position shown in FIG. 5, against the return spring 110. In this state, the diaphragm of the taking lens 10 is in a fully open position. The main diaphragm latching lever 87 is rotated in the clockwise direction by the retraction of the plunger of solenoid 99, which is energized through the association lever 98 and the auxiliary diaphragm latching lever 97. The latch pawl 95 is then disengaged from the latch teeth 108b, and the pulse plate 108 is released.

When the shutter button is depressed by a half step, the photometering operation is commenced. When the shutter button is fully depressed thereafter, the mirror association lever 90 is moved to a position shown by a two-dotted and dashed line from a position shown by a solid line in FIG. 6. The mirror 131 is then moved up to a photographable position in which a picture can be taken. Consequently, the swing lever 103 is moved upwardly in association with the movement of the mirror association lever 90 (see FIG. 6). As a result, the diaphragm adjusting lever 101, which has been prevented from moving upwardly by the slide plate 102, is moved upwardly, so that the aperture of the diaphragm which has been in a full open position is reduced.

Rack 105, which moves upwardly together with the slide plate 102, rotates the large diameter gear 107 in the clockwise direction through the small diameter gear 106, so that the small diameter gear 108c and, accordingly, the pulse plate 108 are rotated in the counterclockwise direction through the large diameter gear 107. The diaphragm photointerrupter 109 reads the displacement of the pulse holes 108a of the pulse plate 108 by counting the number of pulses corresponding to the variation of the diaphragm, and sends the read data to the controller 136. The data is compared with a predetermined reference value in the controller 136. When the diameter of the diaphragm aperture reaches a predetermined reference value, the diaphragm solenoid 99 is energized to release the auxiliary diaphragm latching lever 97.

Figure 6:
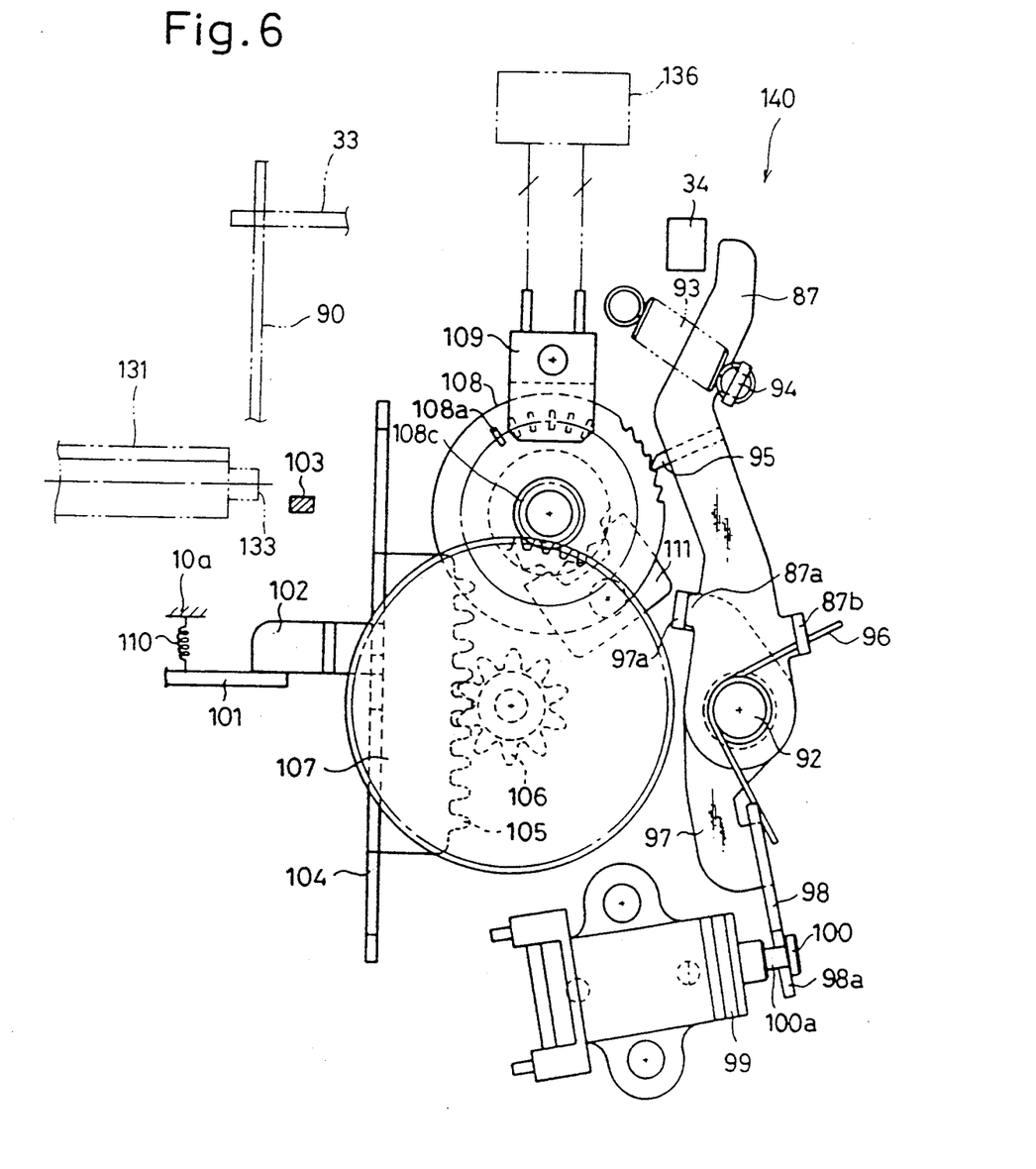
FIG. 6 is a side elevational view of a diaphragm driving mechanism shown in a restricted position after the releasing operation is effected.

As a result, the main diaphragm latching lever 87 is rotated by the return spring 93 in the counterclockwise direction, as viewed in FIG. 5, so that the latch pawl 95 engages with the latch teeth 108b (see FIG. 6). Consequently, rotation of the pulse plate 108 is prevented. Accordingly, no further movement of the slide plate 102, through the large diameter gear 107 and the rack 105, takes place. Thus, the diaphragm adjusting lever 101 on the lens side is stopped at an optimum diaphragm position through the slide plate 102.

After the exposure is completed, the charging motor 18 is rotated in a direction to finish the charging operation, so that the cam gear 32 is rotated in the counterclockwise direction through the pinion gear 25 and the gears 26, 27, and 28. As a result, the mirror gear 31 forces the roller pin 33a outwardly through the first cam surface 31a. Consequently, the mirror charge lever 33 rotates about the rotational shaft 60 to depress and move the mirror association lever 90, which is in the position shown by the two-dotted and dashed line in FIG. 2, in the upwards direction through the front end of the mirror charge lever 33 to thereby charge (drive) the mirror 131.

Similarly, the shutter cam 30 moves the roller pin 38b outwardly through the cam surface 30a to rotate the shutter charge lever 38 in the clockwise direction in FIG. 2. As a result, the charge pin 38a moves the shutter association lever 91 in the left direction in FIG. 2 to charge the shutter after the operation. The rotation of the mirror charge lever 33 causes the switch board 36a to rotate in the clockwise direction through the association arm 115 and the association projection 112, so that the brushes 114, which have been in contact with the contacts 113a and 113b insulated from one another, come into contact with the contacts 113b and 113c which are interconnected (see FIG. 3).

Figure 7:
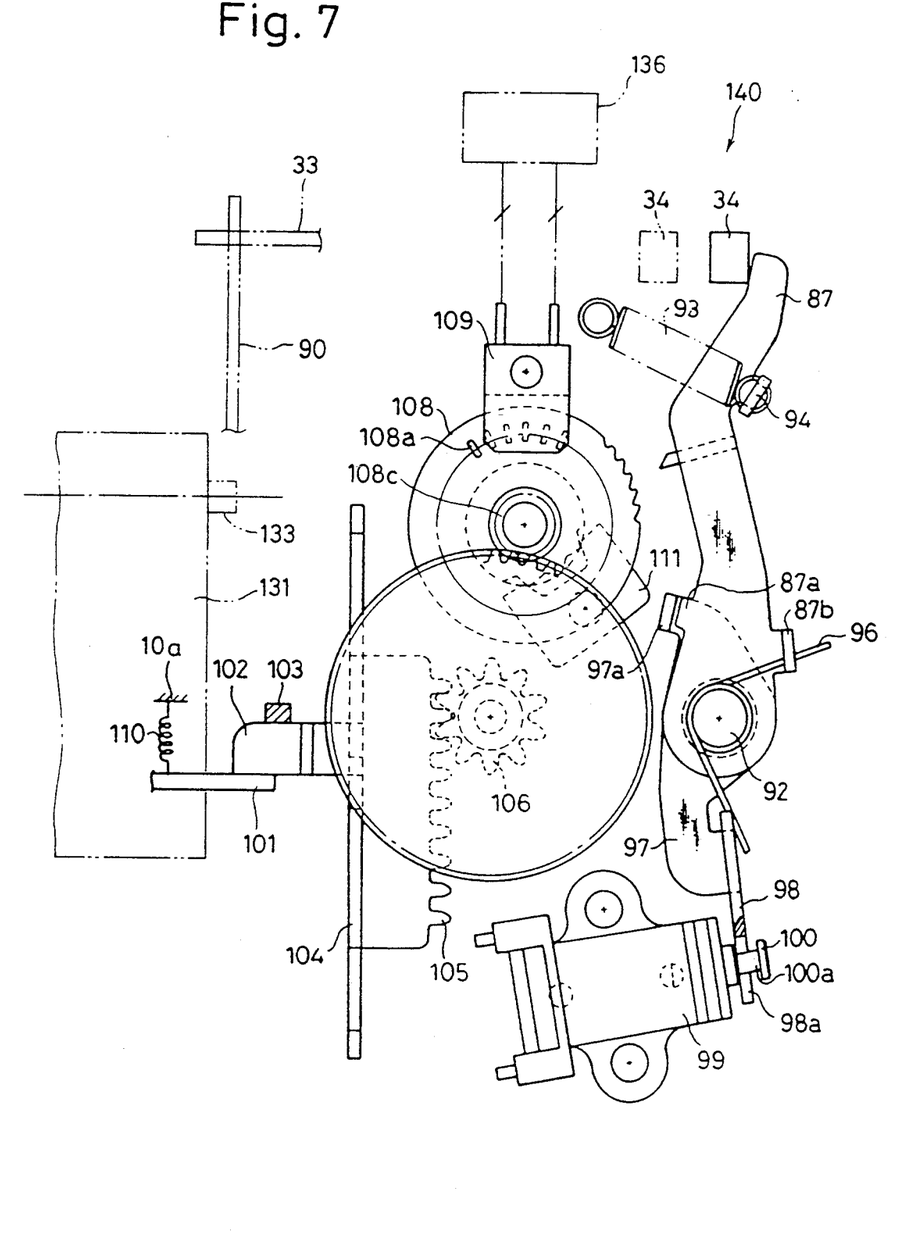
FIG. 7 is a side elevational view of a diaphragm driving mechanism shown in a position immediately before reset of the diaphragm is completed and after exposure is finished.

At the same time, the rotation of the mirror charge lever 33 causes the association pin 88 to move in the direction of the rotation of the lever 33 to depress and rotate the diaphragm reset lever 34 in the clockwise direction in FIG. 2. As a result, the main diaphragm latching lever 87, which has been in a position shown by the two-dotted and dashed line in FIG. 2, is moved by the diaphragm reset lever 34 in the reset direction of the diaphragm against the return spring 93 (i.e., rightward direction as viewed in FIGS. 2 and 6) to come to a position shown in FIGS. 3 and 7.

Figure 3:
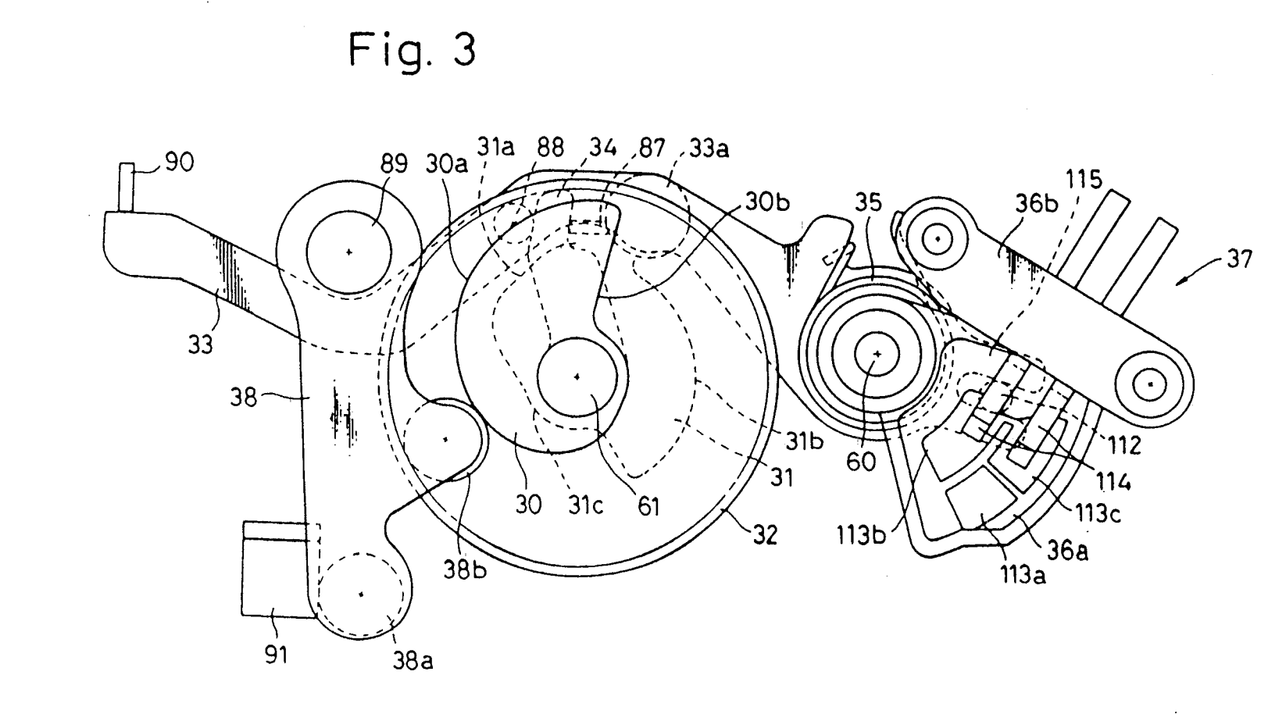
FIG. 3 is a plan view of a shutter charging mechanism and a mirror driving (charging) mechanism of a single lens reflex camera, shown in a position after release and immediately before the mirror charging is completed.

Further rotation of the cam gear 32 from the position shown in FIG. 3, in the same direction, causes the shutter charge lever 38 to rotate in the clockwise direction through the cam surface 30a which gradually increases the diameter in accordance with the rotation of the cam gear. Consequently, the shutter association lever 91 is moved to the shutter charge completion position (see FIG. through the charge pin 38a.

Mirror charge lever 33, which has been rotated by the first cam surface 31a of the large diameter to the angular end position in the clockwise direction to move the mirror association lever 90 to the mirror charge position, gradually moves the front end thereof away from the mirror association lever 90. The rotation of the mirror charge lever 33 causes the association pin 88 to rotate in the same direction, so that the diaphragm reset lever 34 is rotated in the counterclockwise direction by the coil spring 134 (FIG. 1) to come to the position away from the latch lever 87, shown at a two-dotted and dashed line in FIG. 7. Since the plunger 100 is attracted by the permanent magnet of the diaphragm solenoid 99, the main diaphragm latching lever 87 which tends to rotate in the clockwise direction by the spring force of the return spring 93 slightly rotates in the same direction, but a further rotation of the main diaphragm latching lever 87 is restricted by the head of the plunger 100 and, accordingly, the main diaphragm latching lever 87 is held in the diaphragm reset position shown in FIG. 5.

Figure 4:
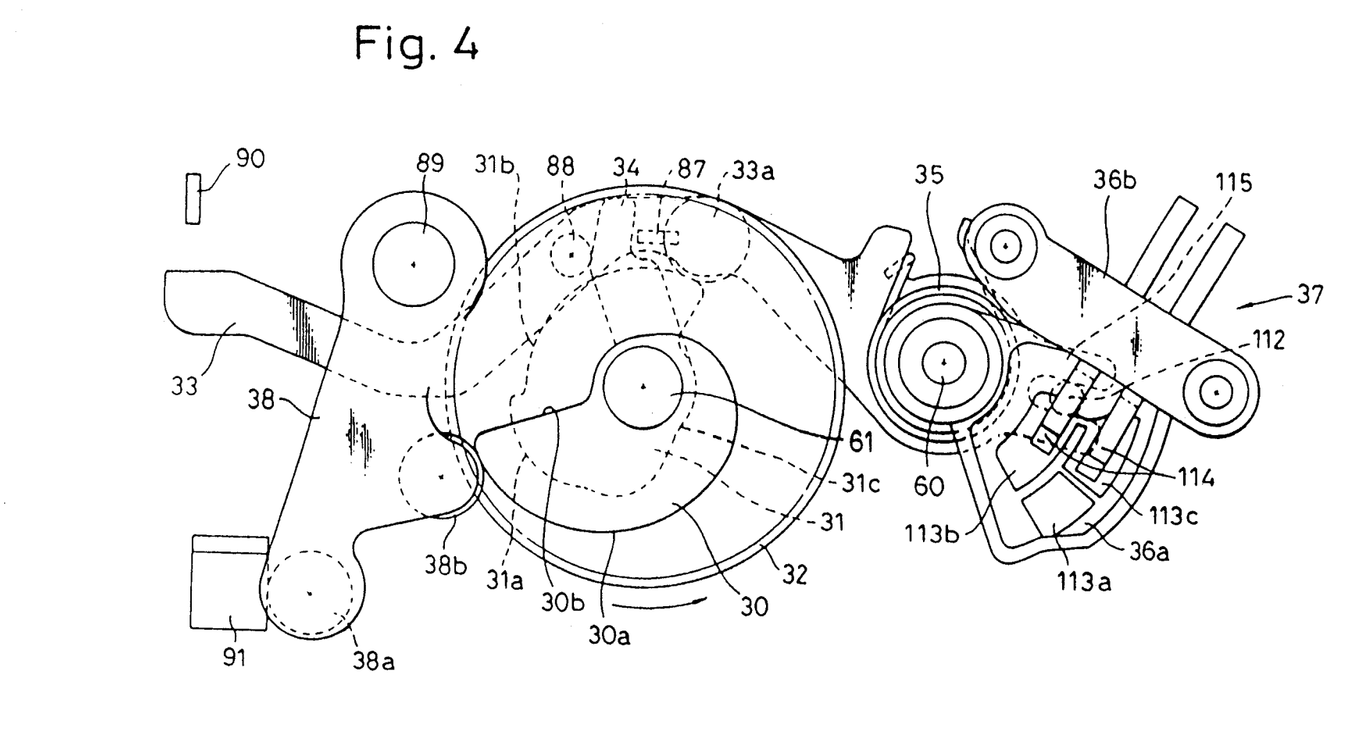
FIG. 4 is a plan view of a shutter charging mechanism and a mirror driving (charging) mechanism of a single lens reflex camera, shown in a position after release and immediately before the shutter charging is completed.

When the cam gear 32 rotates further from the position shown in FIG. 4, the mirror charge lever 33 rotates until the roller pin 33a comes into contact with the rear portion 31c, since the roller pin 33a is released from the second cam surface 31b. At the same time, the shutter charge lever 38 rotates until the roller pin 38b comes into contact with the shutter cam 30b, since the roller pin 38b is released from the cam surface 30a. The rotation of the mirror charge lever 33 causes the switch board 36a to rotate in the counterclockwise direction through the association arm 115 and the association projection 112. As a result, brushes 114, which have been in contact with the contacts 113b and 113c, come into contact with the contacts 113b and 113a, so that one rotation of the cam gear 32 is detected, by one-turn switch 37. The detection signal is provided as output to the controller 136 to stop the rotation of charge motor 18, so that the shutter charge mechanism and the mirror charge mechanism are both returned to the respective initial positions.

Upon completion of the shutter release, the film motor 19 is rotated in the film winding direction in accordance with the drive signal of the film motor 19 outputted from the controller 136. Consequently, the planet lever 42 is rotated in the clockwise direction in FIG. 1 by the small diameter gear 41a which rotates in the counterclockwise direction in FIG. 1 to engage the planet gear 43 with the large diameter gear 56. Consequently, the spool 17 is rotated in the counterclockwise direction (winding direction) in FIG. 1 through the large diameter gear 56, the small diameter gear 55, and the winding gear 54 to wind the film F. Upon winding the film F, the number of revolutions of the rotating plate 57, which is rotated in accordance with, the movement of the film F, is detected by the photointerrupter 58. Accordingly, the film motor 19 is stopped in accordance with the detection signal of the controller 136 when the film F is wound by one frame.

When a rewinding switch (not shown) is turned ON after all the frames of the film F are exposed, the film motor 19 is rotated in the film rewinding direction, in accordance with the signal of the controller 136. The rotation of the sun gear 41, which is caused by the rotation of the film motor 19, causes the planet lever 42 to rotate in the clockwise direction together with the planet gear 43 to engage the latter with the sun gear 44. Consequently, rotation of the film motor 19 is transmitted to the gear 44 and the rewinding reduction gear train 49 through the planet gear 43, so that the rewinding fork 53 is rotated through the through shaft 50, the through shaft gear 51, and the rewinding gear 52 to rewind the exposed film F into the patrone chamber opposite the spool 17.

Upon driving the shutter charge mechanism, the mirror charge mechanism, and the film winding mechanism, the lead wires 72, extending through the lead wire holes 80 of the charge motor 18, extend along the guide groove 79 and the lead wire guide portion 67 and are inserted in the guide holes 77. The lead wires 72 protrude outwardly from the spool through the opening 69a while being held between the guide portion 67 and the guide holes 77. Consequently, the lead wires 72 do not interfere with the rotation of the spool 17, etc.

Although the charge motor 18 is coaxial to the spool 17 in the illustrated embodiment, the coaxial arrangement is not necessary. Furthermore, although the embodiment of the present invention discussed above is applied to a single lens reflex camera having a strobe incorporated therein, the present invention can be applied to a single lens reflex camera to which an external strobe can be detachably attached.

As can be seen from the above discussion, according to the present invention, since a cam gear, having a shutter charging cam and mirror charging cam integral with and coaxial to the shutter charging cam, and a diaphragm reset lever, provided coaxially to the cam gear to reset the diaphragm in association with the cam gear, are provided, the construction can be simplified. Whereas, in prior art, a shutter cam, a mirror cam, a diaphragm resetting cam gear of a diaphragm driving mechanism, and a special operation lever associated with the cam gear are separately provided. The present invention allows for a decrease in the space necessary for the various components to be provided, and a realization of a compact camera.

Although the invention has been described with reference to particular means, materials and embodiments, it is not limited to the particulars disclosed and extends to all equivalents within the scope of the claims.

The disclosure of the present, application is related to copending, concurrently filed U.S. application Ser. Nos. 07/944,318 and 07/944,317, the disclosures of which are hereby expressly incorporated herein by reference in their entireties.

We claim:

1. A mechanical control apparatus of a single lens reflex camera comprising:
   three coaxial rotating members including,
   a shutter cam for charging a shutter of the camera;
   a mirror cam for charging a mirror of the camera; and,
   a diaphragm resetting mechanism for resetting a diaphragm of the camera in association with rotation of at least one said shutter cam and said mirror cam.

2. A mechanical control apparatus according to claim 1, further comprising a mirror charge lever adjacent to said mirror cam for transmitting the rotation of the mirror cam to the mirror.

3. A mechanical control apparatus according to claim 2, wherein said mirror charge lever is rotatably supported at one end thereof.

4. A mechanical control apparatus according to claim 3, further comprising a mirror association lever which is actuated by another end of said mirror charge lever to actuate the mirror.

5. A mechanical control apparatus according to claim 4, further comprising a one-term switch adjacent to the one end of said mirror charge lever for detecting rotation of said mirror cam.

6. A mechanical control apparatus according to claim 5, further comprising an association arm formed on the one end of said mirror charge lever to actuate said one-turn switch.

7. A mechanical control apparatus according to claim 6, wherein said mirror charge lever has a roller pin through which the mirror cam rotates said mirror charge lever.

8. A mechanical control apparatus according to claim 2, further comprising a diaphragm driving mechanism for driving a diaphragm of the camera.

9. A mechanical control apparatus according to claim 8, wherein said diaphragm driving mechanism comprises a main diaphragm latching lever adjacent to said mirror charge lever.

10. A mechanical control apparatus according to claim 9, wherein said diaphragm resetting means comprises a diaphragm reset lever.

11. A mechanical control apparatus according to claim 10, wherein said mirror charge lever comprises a association pin which rotates said diaphragm reset lever together with said mirror charge lever when said mirror charge lever rotates.

12. A mechanical control apparatus according to claim 11, further comprising a shutter association lever for driving the shutter and a shutter charge lever for transmitting the operational force of the shutter cam to said shutter association lever.

13. A mechanical control apparatus according to claim 12, wherein said main diaphragm latching lever, said shutter charge lever, and said mirror charge lever are at least partially located in a limited space defined within the camera together with said three coaxial rotating members.

14. The mechanical control apparatus according to claim 1, wherein said shutter cam and said mirror cam are integral.

15. The mechanical control apparatus according to claim 1, further comprising means for biasing said diaphragm resetting mechanism towards a predetermined position about a rotational axis of said shutter cam.

16. A mechanical control apparatus of a single lens reflex camera comprising:
   a shutter cam for charging a shutter;
   a mirror cam for charging a mirror; and,
   a diaphragm resetting lever for resetting a diaphragm of the camera in association with rotation of said mirror cam;
   means for mounting said shutter cam, said mirror cam, and said diaphragm resetting lever for rotation coaxially with each other.

17. The mechanical control apparatus according to claim 16, wherein said shutter cam and said mirror cam are integral.

18. The mechanical control apparatus according to claim 16, further comprising means for biasing said diaphragm resetting lever towards a predetermined position about a rotational axis of said shutter cam.

19. A mechanical control apparatus of a single lens reflex camera comprising:
   a mirror charge mechanism for charging a mirror provided on an optical axis of a taking lens of the camera;
   a shutter charge mechanism for charging a shutter of the camera;
   a diaphragm driving mechanism for driving a diaphragm of the camera;
   a rotatable cam member comprising a first cam mounted for rotation to drive said mirror charge mechanism and a second cam mounted for rotation to drive said shutter charge mechanism to thereby charge the shutter and the mirror of the camera at a predetermined time, said first cam mounted for coaxial rotation with said second cam; and,
   a resetting lever coaxial to said rotatable cam member for driving said diaphragm driving mechanism in association with the charging operation of the mirror to thereby reset the diaphragm.

20. The mechanical control apparatus according to claim 19, wherein said first and second cams are integral.

21. The mechanical control apparatus according to claim 19, further comprising means for biasing said resetting lever towards a predetermined position about a rotational axis of said second cam.

* * * * *

UNITED STATES PATENT AND TRADEMARK OFFICE
CERTIFICATE OF CORRECTION

PATENT NO. : 5,309,184
DATED : May 3, 1993
INVENTOR(S) : T. KITAZAWA et al.

It is certified that error appears in the above-indentified patent and that said Letters Patent is hereby corrected as shown below:

On the title page item [30]", "1992" should be ---1991---.

Signed and Sealed this

Eighteenth Day of October, 1994

Attest:

BRUCE LEHMAN

Attesting Officer        Commissioner of Patents and Trademarks